(12) United States Patent
Hosaka et al.

(10) Patent No.: US 7,208,435 B2
(45) Date of Patent: Apr. 24, 2007

(54) SOLID CATALYST COMPONENT FOR OLEFIN POLYMERIZATION AND CATALYST

(75) Inventors: Motoki Hosaka, Kanagawa (JP); Maki Sato, Kanagawa (JP)

(73) Assignee: Toho Catalyst Co., Ltd., Kurobe-shi (JP)

( * ) Notice: Subject to any disclaimer, the term of this patent is extended or adjusted under 35 U.S.C. 154(b) by 82 days.

(21) Appl. No.: 10/514,727

(22) PCT Filed: Aug. 26, 2003

(86) PCT No.: PCT/JP03/10740

§ 371 (c)(1),
(2), (4) Date: Nov. 24, 2004

(87) PCT Pub. No.: WO2004/020480

PCT Pub. Date: Mar. 11, 2004

(65) Prior Publication Data

US 2005/0227856 A1    Oct. 13, 2005

(30) Foreign Application Priority Data

Aug. 29, 2002 (JP) ............................. 2002-251077
Sep. 18, 2002 (JP) ............................. 2002-271014
Dec. 27, 2002 (JP) ............................. 2002-380729
Dec. 27, 2002 (JP) ............................. 2002-380730

(51) Int. Cl.
*C08F 4/60* (2006.01)

(52) U.S. Cl. ............... 502/102; 502/103; 502/115; 502/116; 502/118; 502/125

(58) Field of Classification Search ............... 502/102, 502/103, 115, 118, 125, 116
See application file for complete search history.

(56) References Cited

U.S. PATENT DOCUMENTS

| | | | |
|---|---|---|---|
| 6,204,215 B1 | 3/2001 | Kadoi et al. | |
| 6,469,112 B2* | 10/2002 | Cheng et al. | 526/124.3 |
| 6,521,560 B1* | 2/2003 | Kojoh et al. | 502/104 |
| 6,664,209 B1* | 12/2003 | Hosaka | 502/150 |
| 6,770,586 B2* | 8/2004 | Tashino et al. | 502/127 |
| 6,825,309 B2* | 11/2004 | Morini et al. | 526/351 |
| 6,855,663 B1* | 2/2005 | Yang | 502/242 |
| 6,887,817 B2* | 5/2005 | Lu et al. | 502/103 |
| 6,903,041 B2* | 6/2005 | Kumamoto et al. | 502/128 |
| 6,914,028 B2* | 7/2005 | Yang et al. | 502/125 |
| 6,916,759 B2* | 7/2005 | Yang et al. | 502/125 |
| 6,930,069 B2* | 8/2005 | Tashino et al. | 502/103 |
| 2004/0102310 A1* | 5/2004 | Yabunouchi et al. | 502/115 |

FOREIGN PATENT DOCUMENTS

| | | |
|---|---|---|
| CN | 1199054 | 11/1998 |
| EP | 0 552 798 | 7/1993 |
| EP | 0 700 943 | 3/1996 |
| EP | 0 796 872 | 9/1997 |
| JP | 2003-119216 | 4/2003 |

* cited by examiner

*Primary Examiner*—Paul Marcantoni
(74) *Attorney, Agent, or Firm*—Oblon, Spivak, McClelland, Maier & Neustadt, P.C.

(57) ABSTRACT

A solid catalyst component for polymerization of olefins prepared by contacting (a) a dialkoxy magnesium compound, (b) a tetra-valent titanium halide, and (c) an electron donor compound of the formula $R^1R^2C(COOR^3)_2$ suspended in (d) an aromatic hydrocarbon having a boiling point in the range of 50–150° C. The catalyst containing the catalyst component is excellent in the olefin polymerization catalyst activity to hydrogen and can produce a polymer with a high stereoregularity in a high yield.

20 Claims, 1 Drawing Sheet

Fig 1.

SOLID CATALYST COMPONENT FOR OLEFIN POLYMERIZATION AND CATALYST

TECHNICAL FIELD

The present invention relates to a solid catalyst component and a catalyst for polymerization of olefins, which exhibit high activity and excellent catalytic activity to hydrogen and can produce highly stereoregular polymers in a high yield.

BACKGROUND ART

A solid catalyst component containing magnesium, titanium, an electron donor compound, and a halogen as essential components used for the polymerization of olefins such as propylene has been known in the art. A large number of methods for polymerizing or copolymerizing olefins in the presence of a catalyst for olefin polymerization comprising the above solid catalyst component, an organoaluminum compound, and an organosilicon compound have been proposed. For example, Japanese Unexamined Patent Publication No. (hereinafter referred to as JP-A) 63310/1982 and JP-A No. 63311/1982 propose a method for polymerizing olefins, particularly olefins with three or more carbon atoms, in which a catalyst comprising a solid catalyst component containing a magnesium compound, a titanium compound, and an electron donor, an organoaluminum compound, and an organosilicon compound having an Si—O—C linkage in combination is used. However, because these methods are not necessarily satisfactory for producing highly stereoregular polymers in a high yield, improvement of these methods has been desired.

JP-A No. 3010/1988 proposes a catalyst and method for polymerizing propylene. The catalyst comprises a solid catalyst component, obtained by processing a powder produced from dialkoxy magnesium, aromatic dicarboxylic acid diester, aromatic hydrocarbon, and titanium halide with heat, an organoaluminum compound, and an organosilicon compound.

JP-A No. 315406/1989 proposes another propylene polymerization catalyst and a method for polymerizing propylene in the presence of this catalyst. The catalyst comprises a solid catalyst component obtained by preparing a suspension from diethoxy magnesium and alkyl benzene, causing this suspension to come into contact with titanium tetrachloride, and reacting the resulting product with phthalic acid dichloride, an organoaluminum compound, and an organosilicon compound.

All of the above-described conventional technologies have attained certain results in improving catalytic activity to the extent of permitting dispensing with an ash-removal step for removing catalyst residues such as chlorine and titanium from formed polymers, improving the yield of stereoregular polymers, and improving durability of catalytic activity during polymerization.

The polymers produced using these catalysts are used in a variety of applications including formed products such as vehicles and household electric appliances, containers, and films. These products are manufactured by melting polymer powders produced by polymerization and forming the melted polymers using various molds. In manufacturing formed products, particularly, large products by injection molding or the like, melted polymers are sometimes required to have a high fluidity (a melt flow rate). Accordingly, a large number of studies have been undertaken to increase the melt flow rate of polymers.

The melt flow rate greatly depends on the molecular weight of the polymers. In the industry, hydrogen is generally added as a molecular weight regulator for polymers during polymerization of propylene. In this instance, a large quantity of hydrogen is usually added to produce low molecular weight polymers having a high melt flow rate. However, the quantity of hydrogen which can be added is limited because pressure resistance of the reactor is limited because of safety. In order to add a larger amount of hydrogen, the partial pressure of monomers to be polymerized has to be decreased. The decrease in the partial pressure, however, is accompanied by a decrease in productivity. Additionally, use of a large amount of hydrogen may bring about a problem of cost. Development of a catalyst capable of producing polymers with a high melt flow rate by using a smaller amount of hydrogen, in other words, a catalyst which has high activity to hydrogen and can produce a highly stereoregular polymer in a high yield has therefore been desired. However, the above-mentioned conventional technologies were insufficient to solve these problems.

In addition, taking these environmental problems, development of a compound without a benzene ring instead of the compounds containing a benzene ring mainly used as electron donors for preparing the solid catalyst component in above-mentioned conventional technologies is desired.

Accordingly, an object of the present invention is to solve such problems remaining in the prior art and to provide a solid catalyst component and a catalyst for polymerization of olefins, free from aromatic esters in the catalyst component, having excellent catalytic activity to hydrogen and high activity, and capable of producing polymers with high stereoregularity in a high yield.

DISCLOSURE OF THE INVENTION

In view of this situation, the inventor of the present invention has undertaken extensive studies to solve the problems in the conventional technologies remaining still to be solved. As a result, the inventor has found that a solid catalyst component prepared using a magnesium compound such as dialkoxy magnesium and using a malonic acid diester or a substituted malonic acid diester as an internal donor exhibits an extremely high effect and can solve the above problems. This finding has led to the completion of the present invention.

To achieve the above object, a solid catalyst component (A1) for polymerization of olefins of the present invention is prepared by contacting (a1) a dialkoxy magnesium compound, (b) a tetravalent titanium halide, and (c) an electron donor compound of the following formula (1), $$R^1R^2C(COOR^3)_2 \qquad (1)$$

wherein $R^1$ and $R^2$ individually represent a hydrogen atom, halogen atom, linear or branched alkyl group having 1–20 carbon atoms, cycloalkyl group, phenyl group, vinyl group, allyl group, aralkyl group, or linear or branched alkyl group having 1–10 carbon atoms substituted with one or two halogen atoms, and $R^3$ individually represents a linear or branched alkyl group having 1–20 carbon atoms, cycloalkyl group, phenyl group, vinyl group, allyl group, or aralkyl group, in (d) an aromatic hydrocarbon having a boiling point in the range of 50–150° C.

In addition, another solid catalyst component (A2) for polymerization of olefins of the present invention is prepared by contacting (a2) a magnesium compound, (b) a tetravalent titanium halide, (c) an electron donor compound of the following formula (1), $$R^1R^2C(COOR^3)_2 \tag{1}$$

wherein $R^1$ and $R^2$ individually represent a hydrogen atom, halogen atom, linear or branched alkyl group having 1–20 carbon atoms, cycloalkyl group, phenyl group, vinyl group, allyl group, aralkyl group, or linear or branched alkyl group having 1–10 carbon atoms substituted with one or two halogen atoms, and $R^3$ individually represents a linear or branched alkyl group having 1–20 carbon atoms, cycloalkyl group, phenyl group, vinyl group, allyl group, or aralkyl group, and (e) an electron donor compound of the following formula (2), $$(R^4)_l C_6H_4(COOR^5)(COOR^6) \tag{2}$$

wherein $R^4$ is a linear or branched alkyl group having 1–8 carbon atoms or a halogen atom, $R^5$ and $R^6$ individually represent a linear or branched alkyl group having 1–12 carbon atoms, and l indicates the number of substituent $R^4$ and is 0, 1, or 2, wherein the groups $R^4$ may be either the same or different when l is 2.

Still another solid catalyst component (A3) for polymerization of olefins of the present invention is prepared by contacting (a2) a magnesium compound, (b) a tetravalent titanium halide, (c) an electron donor compound of the following formula (1), $$R^1R^2C(COOR^3)_2 \tag{1}$$

wherein $R^1$ and $R^2$ individually represent a hydrogen atom, halogen atom, linear or branched alkyl group having 1–20 carbon atoms, cycloalkyl group, phenyl group, vinyl group, allyl group, aralkyl group, or linear or branched alkyl group having 1–10 carbon atoms substituted with one or two halogen atoms, and $R^3$ individually represents a linear or branched alkyl group having 1–20 carbon atoms, cycloalkyl group, phenyl group, vinyl group, allyl group, or aralkyl group, and (f) an electron donor compound of the following formula (3), $$\begin{array}{c} R^7-C-COOR^9 \\ \parallel \\ R^8-C-COOR^{10} \end{array} \tag{3}$$

wherein $R^7$ and $R^8$ individually represent a hydrogen atom, halogen atom, linear or branched alkyl group having 1–8 carbon atoms, or linear or branched alkyl group having 1–10 carbon atoms substituted with one or two halogen atoms, and $R^9$ and $R^{10}$ individually represent a linear or branched alkyl group having 2–8 carbon atoms.

Still another solid catalyst component (A4) for polymerization of olefins of the present invention is prepared by contacting one another (a2) a magnesium compound, (b) a tetravalent titanium halide, (c) an electron donor compound of the following formula (1), $$R^1R^2C(COOR^3)_2 \tag{1}$$

wherein $R^1$ and $R^2$ individually represent a hydrogen atom, halogen atom, linear or branched alkyl group having 1–20 carbon atoms, cycloalkyl group, phenyl group, vinyl group, allyl group, aralkyl group, or linear or branched alkyl group having 1–10 carbon atoms substituted with one or two halogen atoms, and $R^3$ individually represents a linear or branched alkyl group having 1–20 carbon atoms, cycloalkyl group, phenyl group, vinyl group, allyl group, or aralkyl group, and (g) a siloxane.

The catalyst for polymerization of olefins of the present invention comprises the above solid catalyst component (A1), (A2), (A3), or (A4), (B) an organoaluminum compound of the following formula (4), $$R^{11}_p AlQ_{3-p} \tag{4}$$

wherein $R^{11}$ represents a linear or branched alkyl group having 1–4 carbon atoms, Q represents a hydrogen atom or a halogen atom, and p represents a real number satisfying the formula $0 < p \leq 3$, and (C) an electron donor compound.

The catalyst for polymerization of olefins of the present invention exhibits a high catalyst activity to hydrogen and can produce olefin polymers in a high yield while maintaining high stereoregularity of the olefin polymers. The catalyst is therefore expected not only to produce polyolefins for common use at a low cost, but also to be useful in the manufacture of olefin copolymers having high functions.

BEST MODE FOR CARRYING OUT THE INVENTION

Figure 1:
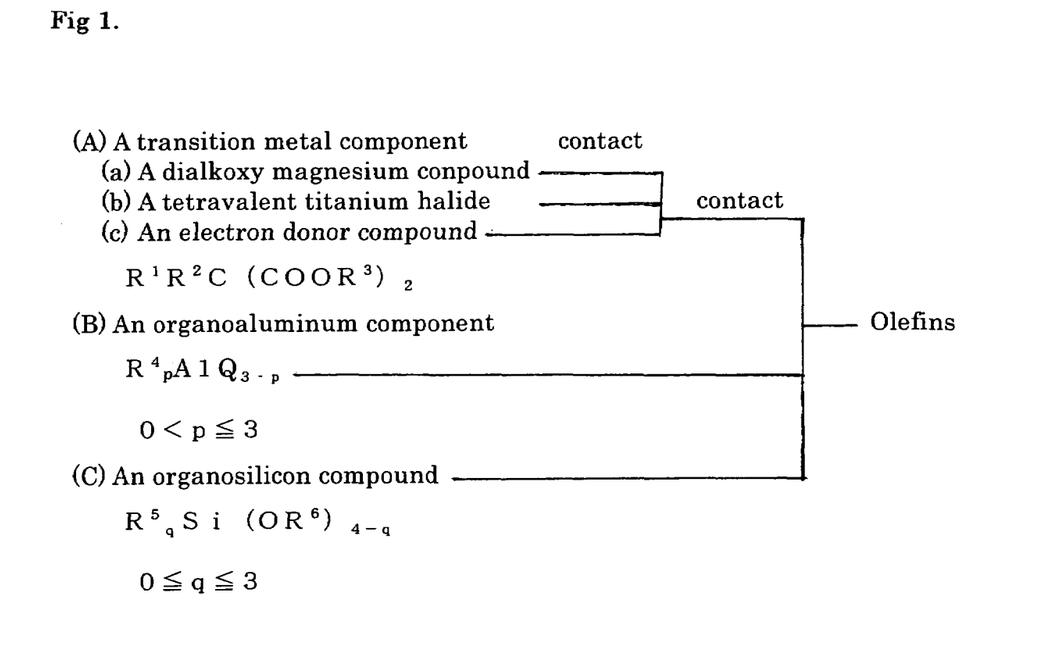
FIG. 1 is a flow chart showing a process for preparing the polymerization catalyst of the present invention.

As the dialkoxy magnesium (a1) (hereinafter may be referred to as "component (a1)") used for preparing the solid catalyst component (A1) (hereinafter may be referred to as "component (A1)") for olefin polymerization of the present invention, a compound represented by the formula $Mg(OR^{14})(OR^{15})$, wherein $R^{14}$ and $R^{15}$ individually represent an alkyl group having 1–10 carbon atoms, is preferable. Specific examples include dimethoxymagnesium, diethoxymagnesium, dipropoxymagnesium, dibutoxymagnesium, ethoxymethoxymagnesium, ethoxypropoxymagnesium, and butoxyethoxymagnesium. These dialkoxy magnesium compounds may be prepared by reacting metallic magnesium with an alcohol in the presence of a halogen or a halogen-containing metal compound. The above dialkoxy magnesium compounds may be used either individually or in combination of two or more.

The dialkoxy magnesium compound used for preparing the solid catalyst component (A1) in the present invention may be in the form of either granules or powder and may be either amorphous or spherical in the configuration. For example, when spherical dialkoxy magnesium is used, the resulting polymer is in the form of a powder having a more excellent granular form and a narrower particle distribution. This improves handle ability of the polymer powder produced during polymerization operation and eliminates problems such as clogging caused by fine particles contained in the polymer powder.

The spherical dialkoxy magnesium need not necessarily be completely spherical, but may be oval or potato-shaped. Specifically, the particles may have a ratio (l/w) of the major axis diameter (l) to the minor axis diameter (w) usually of 3 or less, preferably of 1 to 2, and more preferably of 1 to 1.5.

Dialkoxy magnesium with an average particle size from 1 to 200 μm can be used. A more preferable average particle size is 5 to 150 μm. In the case of spherical dialkoxy magnesium, the average particle size is usually from 1 to 100 µm, preferably from 5 to 50 µm, and more preferably from 10 to 40 µm. A powder having a narrow particle size distribution with a small fine and coarse powder content is preferably used. Specifically, the content of particles with a diameter of 5 µm or less should be 20% or less, and preferably 10% or less. On the other hand, the content of particles with a diameter of 100 µm or more should be 10% or less, and preferably 5% or less. Moreover, the particle size distribution represented by ln (D90/D10), wherein D90 is a particle size of 90% of the integrated particle size and D10 is a particle size of 10% of the integrated particle size, is 3 or less, and preferably 2 or less.

Methods of producing such spherical dialkoxy magnesium are described in, for example, JP-A No. 41832/1983, JP-A No. 51633/1987, JP-A No. 74341/1991, JP-A No. 368391/1992, and JP-A No. 73388/1996.

The tetravalent titanium halide compound (b) used for preparing the component (A1) in the present invention is one or more compounds selected from titanium halides and alkoxy titanium halides of the formula $Ti(OR^{16})_nX_{4-n}$, wherein $R^{16}$ indicates an alkyl group having 1–4 carbon atoms, X is a halogen atom such as a chlorine atom, bromine atom, or iodine atom, and n is an integer of 0–4.

Specific examples include, as titanium halides, titanium tetrahalides such as titanium tetrachloride, titanium tetrabromide, and titanium tetraiodide and, as alkoxytitanium halides, methoxytitanium trichloride, ethoxytitanium trichloride, propoxytitanium trichloride, n-butoxytitanium trichloride, dimethoxytitanium dichloride, diethoxytitanium dichloride, dipropoxytitanium dichloride, di-n-butoxytitanium dichloride, trimethoxytitanium chloride, triethoxytitanium chloride, tripropoxytitanium chloride, and tri-n-butoxy titanium chloride. Of these, titanium tetrahalides are preferable, with titanium tetrachloride being particularly preferable. These titanium compounds may be used either individually or in combination of two or more.

The electron donor compound (c) used for preparing the solid catalyst component (A1) in the present invention is a malonic acid diester, halogen substituted malonic acid diester, alkyl substituted malonic acid diester, or haloalkyl substituted malonic acid diester represented by the above-described formula (1).

When $R^1$ or $R^2$ in the formula (1) is a halogen atom, a chlorine atom, bromine atom, and iodine atom can be given as the halogen atom. Of these, a chlorine atom and bromine atom are preferable. In the above formula, $R^1$ and $R^2$ are preferably a branched alkyl group having 3–10 carbon atoms including one or more secondary, tertiary, or quaternary carbon atoms, particularly preferably an isobutyl group, t-butyl group, isopentyl group, or neopentyl group. As $R^3$ which is a carbonyl ester residue of the above formula (1), alkyl groups, particularly linear or branched alkyl groups having 1–8 carbon atoms such as an ethyl group, propyl group, isopropyl group, butyl group, isobutyl group, t-butyl group, pentyl group, isopentyl group, and neopentyl group, are preferable.

As specific examples of the malonic acid diester, diethyl malonate, dipropyl malonate, dibutyl malonate, diisobutyl malonate, dipentyl malonate, and dineopentyl malonate can be given.

As specific examples of the halogen-substituted malonic acid diester, diethyl chloromalonate, diethyl dichloromalonate, diethyl bromomalonate, diethyl dibromomalonate, dipropyl chloromalonate, dipropyl dichloromalonate, dipropyl bromomalonate, dipropyl dibromomalonate, dibutyl chloromalonate, dibutyl dichloromalonate, dibutyl bromomalonate, dibutyl dibromomalonate, diisobutyl chloromalonate, diisobutyl dichloromalonate, diisobutyl bromomalonate, diisobutyl dibromomalonate, dipentyl chloromalonate, dipentyl dichloromalonate, dipentyl bromomalonate, dipentyl dibromomalonate, dineopentyl chloromalonate, dineopentyl dichloromalonate, dineopentyl bromomalonate, dineopentyl dibromomalonate, diisooctyl chloromalonate, diisooctyl dichloromalonate, diisooctyl bromomalonate, and diisooctyl dibromomalonate can be given.

As specific examples of the alkyl- and halogen-substituted malonic acid diester, dibutyl ethylchloromalonate, dibutyl ethylbromomalonate, dibutyl isopropylchloromalonate, dibutyl isopropylbromomalonate, diisobutyl isopropylchloromalonate, diisobutyl isopropylbromomalonate, dineopentyl isopropylchloromalonate, dineopentyl isopropylbromomalonate, diethyl butylchloromalonate, diethyl butylbromomalonate, diethyl isobutylchloromalonate, and diethyl isobutylbromomalonate can be given.

As specific examples of the alkyl-substituted malonic acid diester, diethyl diisopropylmalonate, dipropyl diisopropylmalonate, diisopropyl diisopropylmalonate, dibutyl diisopropylmalonate, diisobutyl diisopropylmalonate, dineopentyl diisopropylmalonate, diethyl diisobutylmalonate, dipropyl diisobutylmalonate, diisopropyl diisobutylmalonate, dibutyl diisobutylmalonate, diisobutyl diisobutylmalonate, dineopentyl diisobutylmalonate, diethyl diisopentylmalonate, dipropyl diisopentylmalonate, diisopropyl diisopentylmalonate, dibutyl diisopentylmalonate, diisobutyl diisopentylmalonate, dineopentyl diisopentylmalonate, diethyl isopropylisobutylmalonate, dipropyl isopropylisobutylmalonate, diisopropyl isopropylisobutylmalonate, dibutyl isopropylisobutylmalonate, diisobutyl isopropylisobutylmalonate, dineopentyl isopropylisobutylmalonate, dimethyl isopropylisopentylmalonate, diethyl isopropylisopentylmalonate, dipropyl isopropylisopentylmalonate, diisopropyl isopropylisopentylmalonate, dipropyl isopropylisopentylmalonate, diisobutyl isopropylisopentylmalonate, and dineopentyl isopropylisopentylmalonate can be given.

As specific examples of the haloalkyl-substituted malonic acid diester, diethyl bis(chloromethyl)malonate, diethyl bis(bromomethyl)malonate, diethyl bis(chloroethyl)malonate, diethyl bis(bromoethyl)malonate, diethyl bis(3-chloro-n-propyl)malonate, and diethyl bis(3-bromo-n-propyl)malonate can be given. Among these electron donor compounds, diethyl isopropylbromomalonate, diethyl butylbromomalonate, diethyl isobutylbromomalonate, diethyl diisopropylmalonate, diethyl dibutylmalonate, diethyl diisobutylmalonate, diethyl diisopentylmalonate, diethyl isopropylisobutylmalonate, dimethyl isopropylisopentylmalonate, diethyl (3-chloro-n-propyl)malonate, and diethyl bis(3-bromo-n-propyl)malonate are preferable. The above compounds may be used either individually or in combination of two or more as the component (c).

In the solid catalyst component (A1) of the present invention, if the above-mentioned malonic acid diesters or the substituted malonic acid diesters are used as the electron donor compound for preparing the solid catalyst component, high activity and excellent catalyst activity to hydrogen can be ensured and a polymer with high stereoregularity can be produced in a high yield without using an aromatic ester compound. In addition, environmental problems related to safety, health, and the like can be overcome.

Moreover, if an electron donor compound (e) of the above-described general formula (2) is used in combination with the electron donor compound (c) in the solid catalyst component (A1), catalyst activity to hydrogen can be improved even more and a highly streoregular polymer containing only a slight amount of fine powders and having a uniform particle size distribution can be produced in a high yield.

The electron donor compound (e) represented by the above-described formula (2) is a phthalic acid diester, halogen-substituted phthalic acid diester, alkyl-substituted phthalic acid diester, haloalkyl substituted phthalic acid diester, or the like.

Specific examples of the phthalic acid diester include the following compounds: dimethyl phthalate, diethyl phthalate, di-n-propyl phthalate, diisopropyl phthalate, di-n-butyl phthalate, diisobutyl phthalate, ethylmethyl phthalate, methyl(isopropyl)phthalate, ethyl(n-propyl)phthalate, ethyl(n-butyl)phthalate, ethyl(isobutyl)phthalate, di-n-pentyl phthalate, diisopentyl phthalate, dineopentyl phthalate, dihexyl phthalate, di-n-heptyl phthalate, di-n-octyl phthalate, bis(2,2-dimethylhexyl)phthalate, bis(2-ethylhexyl)phthalate, di-n-nonylphthalate, diisodecyl phthalate, bis(2,2-dimethylheptyl)phthalate, n-butyl(isohexyl)phthalate, n-butyl(2-ethylhexyl)phthalate, n-pentylhexyl phthalate, n-pentyl(isohexyl)phthalate, isopentyl(heptyl)phthalate, n-pentyl(2-ethylhexyl) phthalate, n-pentyl(isononyl)phthalate, isopentyl(n-decyl) phthalate, n-pentylundecyl phthalate, isopentyl(isohexyl) phthalate, n-hexyl(2,2-dimethylhexyl)phthalate, n-hexyl(2-ethylhexyl)phthalate, n-hexyl(isononyl) phthalate, n-hexyl(n-decyl)phthalate, n-heptyl(2-ethylhexyl) phthalate, n-heptyl(isononyl) phthalate, n-heptyl(neodecyl) phthalate, and 2-ethylhexyl(isononyl)phthalate. One or more of these compounds can be used.

In the formula (2) for the phthalic acid diester, given as specific examples of the alkyl group having 1–8 carbon atoms represented by $R^4$ are a methyl group, ethyl group, n-propyl group, isopropyl group, n-butyl group, isobutyl group, t-butyl group, n-pentyl group, isopentyl group, neopentyl group, n-hexyl group, isohexyl group, 2,2-dimethylbutyl group, 2,2-dimethylpentyl group, isooctyl group, and 2,2-dimethylhexyl group. As the halogen atom represented by $R^4$, a fluorine atom, chlorine atom, bromine atom, and iodine atom can be given. Of these, a methyl group, a bromine atom, and a fluorine atom are preferable for $R^4$, with a methyl group and a bromine atom being particularly preferable.

The groups represented by $R^5$ or $R^6$ in the formula (2) include a methyl group, ethyl group, n-propyl group, isopropyl group, n-butyl group, isobutyl group, t-butyl group, n-pentyl group, isopentyl group, neopentyl group, n-hexyl group, isohexyl group, 2,2-dimethylbutyl group, 2,2-dimethylpentyl group, isooctyl group, 2,2-dimethylhexyl group, n-nonyl group, isononyl group, n-decyl group, isodecyl group, and n-dodecyl group. Of these, anethylgroup, n-butylgroup, isobutylgroup, t-butyl group, neopentyl group, isohexyl group, and isooctyl group are preferable, with an ethyl group, n-butyl group, and neopentyl group, being particularly preferable. l, which indicates the number of the substituent $R^4$, is 1 or 2, provided that when l is 2, the two $R^4$ groups may be either the same or different. When l=1, $R^4$ replaces the hydrogen atom at the 3, 4, or 5 position of the phthalic acid diester derivative of the formula (2), and when l=2, $R^4$ replaces the hydrogen atoms at the 4 and 5 positions.

As examples of the substituted phthalic acid diester of the formula (2), diethyl 4-methylphthalate, di-n-butyl 4-methylphthalate, diisobutyl 4-methylphthalate, dineopentyl 4-bromophthalate, diethyl 4-bromophthalate, di-n-butyl 4-bromophthalate, diisobutyl 4-bromophthalate, dineopentyl 4-methylphthalate, dineopentyl 4,5-dimethylphthalate, dineopentyl 4-methylphthalate, dineopentyl 4-ethylphthalate, t-butylneopentyl 4-methylphthalate, t-butylneopentyl 4-ethylphthalate, dineopentyl 4,5-dimethylphthalate, dineopentyl 4,5-diethylphthalate, t-butylneopentyl 4,5-dimethylphthalate, t-butylneopentyl 4,5-diethylphthalate, dineopentyl 3-fluorophthalate, dineopentyl 3-chlorophthalate, dineopentyl 4-chlorophthalate, and dineopentyl 4-bromophthalate can be given.

The above ester compounds are preferably used in combination of two or more. In this instance, the esters are preferably combined so that the total carbon atom number in the alkyl group possessed by one ester may differ four or more from that possessed by another ester.

In the solid catalyst component (A1) of the present invention, if the phthalic acid diester or substituted phthalic acid diester is used together with the above-mentioned malonic acid diester or substituted malonic acid diester as electron donor compounds, higher catalytic activity to hydrogen can be ensured and a polymer with higher stereoregularity containing only a slight amount of fine powders and having uniform particle distribution can be produced in a high yield as compared with the case in which either of the electron donor compounds is used alone.

Moreover, if an electron donor compound (f) of the above formula (3) is used in combination with the electron donor compound (c) in the solid catalyst component (A1) of the present invention, catalytic activity to hydrogen can be improved even more while maintaining the high stereoregularity and the high yield of the polymer.

The electron donor compound (f) represented by the above-described formula (3) is preferably a maleic acid diester, halogen-substituted maleic acid diester, alkyl-substituted maleic acid diester, or haloalkyl-substituted maleic acid diester.

In the maleic acid diester and substituted maleic acid diester represented by the formula (3), the groups represented by $R^9$ or $R^{10}$ in the formula (3) include a methyl group, ethyl group, n-propyl group, isopropyl group, n-butyl group, isobutyl group, t-butyl group, n-pentyl group, isopentyl group, neopentyl group, n-hexyl group, isohexyl group, 2,2-dimethylbutyl group, 2,2-dimethylpentyl group, isooctyl group, 2,2-dimethylhexyl group, n-nonyl group, isononyl group, n-decyl group, isodecyl group, and n-dodecyl group. Of these, an ethyl group, n-butyl group, isobutyl group, t-butyl group, neopentyl group, isohexyl group, and isooctyl group are preferable, with an ethyl group, and n-butyl group, neopentyl group, being particularly preferable.

In the substituted maleic acid diester represented by the formula (3), given as specific examples of the alkyl group having 1–8 carbon atoms represented by $R^7$ or $R^8$ are a methyl group, ethyl group, n-propyl group, isopropyl group, n-butyl group, isobutyl group, t-butyl group, n-pentyl group, isopentyl group, neopentyl group, n-hexyl group, isohexyl group, 2,2-dimethylbutyl group, 2,2-dimethylpentyl group, isooctyl group, and 2,2-dimethylhexyl group. As halogen atoms for $R^7$ or $R^8$, a fluorine atom, chlorine atom, bromine atom, and iodine atom can be given. Of these, a methyl group, an ethyl group, a bromine atom, and a fluorine atom are preferable for $R^7$ and $R^8$, with a methyl group and an ethyl group being particularly preferable.

Specific examples of the maleic acid diester, which is the compound of the formula (3) with both $R^7$ and $R^8$ hydrogen atoms, include dimethyl maleate, diethyl maleate, di-n-propyl maleate, diisopropyl maleate, di-n-butyl maleate, diisobutyl maleate, ethylmethyl maleate, methyl(isopropyl) maleate, ethyl(n-propyl)maleate, ethyl(n-butyl)maleate, ethyl(isobutyl)maleate, di-n-pentyl maleate, diisopentyl maleate, dineopentyl maleate, dihexyl maleate, di-n-heptyl maleate, di-n-octyl maleate, bis(2,2-dimethylhexyl)maleate, bis(2-ethylhexyl)maleate, di-n-nonyl maleate, diisodecyl maleate, bis(2,2-dimethylheptyl)maleate, n-butyl(isohexyl) maleate, n-butyl(2-ethylhexyl)maleate, n-pentylhexyl maleate, n-pentyl(isohexyl)maleate, isopentyl(heptyl)maleate, n-pentyl(2-ethylhexyl)maleate, n-pentyl(isononyl)maleate, isopentyl(n-decyl)maleate, n-pentylundecyl maleate, isopentyl(isohexyl)maleate, n-hexyl(2,2-dimethylhexyl) maleate, n-hexyl(2-ethylhexyl)maleate, n-hexyl(isononyl) maleate, n-hexyl(n-decyl)maleate, n-heptyl(2-ethylhexyl) maleate, n-heptyl(isononyl)maleate, n-heptyl(neodecyl) maleate, and 2-ethylhexyl(isononyl)maleate. Of these, diethyl maleate and di-n-butyl maleate are preferable. One or more of these compounds can be used.

As examples of the halogen-substituted maleic acid diester represented by the formula (3), specifically the compound of the formula (3) in which both $R^7$ and $R^8$ are halogen atoms or either $R^7$ or $R^8$ is a halogen atom and the other is a hydrogen atom, diethyl 1-chloromaleate, di-n-butyl 1-chloromaleate, diethyl 1-bromodichloromaleate, di-n-butyl 1-bromomaleate, diethyl 1,2-dichloromaleate, di-n-butyl 1,2-dichloromaleate, diethyl 1,2-dibromochloromaleate, and di-n-butyl 1,2-dibromomaleate can be given.

As examples of the alkyl-substituted maleic acid diester represented by the formula (3), specifically the compound of the formula (3) wherein both the $R^7$ and $R^8$ groups are alkyl groups, diethyl 1,2-dimethylmaleate, di-n-butyl 1,2-dimethylmaleate, diethyl 1,2-diethylmaleate, and di-n-butyl 1,2-diethylmaleate can be given.

As examples of the haloalkyl substituted maleic acid diester represented by the formula (3), specifically the compound of the formula (3) with both $R^7$ and $R^8$ being haloalkyl groups, diethyl 1,2-bis(chloromethyl)maleate, di-n-butyl 1,2-bis(chloromethyl)methylmaleate, diethyl 1,2-bis(chloromethyl)ethylmaleate, and di-n-butyl 1,2-bis(chloromethyl)ethylmaleate can be given.

These electron donor compounds (f) represented by the formula (3) can be used either individually or in combination of two or more.

In the solid catalyst component (A1) of the present invention, if the electron donor compound (f) is used in combination with the electron donor compound (c) as the electron donor compound for preparing the solid catalyst component, higher catalytic activity to hydrogen can be ensured while maintaining high stereoregularity and high yield of the polymer as compared with the case in which each of these electron donor compounds are used independently. In addition, environmental problems related to safety, health and the like can be overcome due to capability of these electron donors of improving the catalyst activity to hydrogen without using an aromatic ester compound.

In addition to the above components, a siloxane (g) is preferably used for preparing the solid catalyst component (A1) to improve stereoregularity of the polymer while maintaining high catalytic activity to hydrogen.

The siloxane (g) is a compound having a siloxane bond (—Si—O—bond) in the main chain. Examples include disiloxanes such as an alkyl disiloxane, halogen-substituted alkyl disiloxane, 1,3-dihaloalkyl disiloxane, and 1,3-dihalophenyl disiloxane, and polysiloxanes. Polysiloxanes are polymers generally referred to as silicone oil. The polysiloxanes used in the present invention are chain-structured, partially hydrogenated, cyclic, or denatured polysiloxanes which are liquid or viscous at normal temperatures with a viscosity at 25° C. in the range of 0.02–100 cm$^2$/s (2–10,000 cSt), and preferably in the range of 0.03–5 cm$^2$/s (3–500 cSt).

As specific examples of the disiloxanes, hexamethyldisiloxane, hexaethyldisiloxane, hexapropyldisiloxane, hexaphenyldisiloxane, 1,3-divinyltetramethyldisiloxane, 1,3-dichlorotetramethyldisiloxane, 1,3-dibromotetramethyldisiloxane, chloromethylpentamethyldisiloxane, and 1,3-bis(chloromethyl)tetramethyldisiloxane can be given. As specific examples of the trisiloxanes, tetrasiloxanes, or pentasiloxanes, 1,5-dichlorohexamethyltrisiloxane, 1,7-dichlorooctamethyltetrasiloxane, 1,5-dibromohexamethyltrisiloxane, 1,7-dibromooctamethyltetrasiloxane, 3-chloromethylheptamethyltrisiloxane, 3,5-bis(chloromethyl)octamethyltetrasiloxane, 3,5,7-tris(chloromethyl)nonamethylpentasiloxane, 3-bromomethylheptamethyltrisiloxane, 3,5-bis(bromomethyl)octamethyltetrasiloxane, and 3,5,7-tris(bromomethyl)nonamethylpentasiloxane can be given. Of these, 1,7-dichlorooctamethyltetrasiloxane is particularly preferable.

As examples of the chain-structured polysiloxanes, dimethylpolysiloxane, methylphenylpolysiloxane, dichloropolysiloxane, and dibromopolysiloxanecan be given; as examples of the partially hydrogenated polysiloxanes, methyl hydrogen polysiloxanes with a hydrogenation degree of 10 to 80% can be given; as examples of the cyclic polysiloxanes, hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane can be given; as examples of the modified polysiloxane, higher fatty acid group-substituted dimethylsiloxane, epoxy group-substituted dimethylsiloxane, and polyoxyalkylene group-substituted dimethylsiloxane can be given. Of these, decamethylcyclopentasiloxane and dimethylpolysiloxane are preferable, with decamethylcyclopentasiloxane being particularly preferable. These electron donor compounds (g) can be used either individually or in combination of two or more.

In the present invention, the solid catalyst component (A1) is prepared by suspension contact of the raw materials in an aromatic hydrocarbon compound (d) with a boiling point of 50–150° C. As the aromatic hydrocarbon with a boiling point of 50–150° C., toluene, xylene, and ethylbenzene are preferably used. These aromatic hydrocarbons can be used either individually or in combination of two or more. Use of a saturated hydrocarbon compound or the like other than the aromatic hydrocarbons with a boiling point of 50–150° C. lowers solubility of impurities during reaction or washing, giving rise to a decrease in catalytic activity of the resulting solid catalyst component and stereoregularity of the resulting polymer.

The magnesium compounds (hereinafter referred to from time to time simply as "component (a2)") used for preparing the solid catalyst component (A2) (hereinafter referred to from time to time simply as "component (A2)") for polymerization of olefins in the present invention include magnesium dihalide, dialkyl magnesium, alkylmagnesium halide, dialkoxy magnesium, diaryloxy magnesium, alkoxy magnesium halide, and fatty acid magnesium. Among these magnesium compounds, a dialkoxy magnesium compound is preferred. Specific examples include those described in connection with the preparation of the solid catalyst component (A1).

The same compounds as used for preparing the solid catalyst component (A1), including (b) thetetravalenttitanium halide, (c) the electron donor compound of the formula (1), and (e) the electron donor compound of the formula (2), can be used for preparing the solid catalyst component (A2).

The same magnesium compound (a2) used for preparing the solid catalyst component (A2) can be used for preparing the solid catalyst component (A3) of the present invention. As to (b) the tetravalent titanium halide, (c) the electron donor compound of the formula (1), and (f) the electron donor compound of the formula (2), the same compounds as used for preparing the solid catalyst component (A1) can be used for preparing the solid catalyst component (A3).

In addition to the above components, a siloxane (g) is preferably used for preparing the solid catalyst components (A2) and (A3) to improve stereoregularity of the polymer while maintaining high catalyst activity to hydrogen.

The same magnesium compound (a2) used for preparing the solid catalyst component (A2) can be used for preparing the solid catalyst component (A4) of the present invention. As to (b) the tetravalent titanium halide, (c) the electron donor compound of the formula (1), and (g) the siloxane of the formula (2), the same compounds as used for preparing the solid catalyst component (A1) can be used for preparing the solid catalyst component (A4).

The solid catalyst components (A2) and (A3) are preferably prepared using a suspension of the components in an aromatic hydrocarbon compound (d) used for preparing the solid catalyst component (A1). Use of the aromatic hydrocarbon compound (d) can improve catalyst activity and stereoregularity of the polymer.

In preparing the solid catalyst components (A1), (A2), and (A3), these components are caused to contact each other in a vessel equipped with a stirrer in an inert gas atmosphere from which water and the like have been removed while stirring. When the components contact one another by stirring for preparing the mixture or are dispersed or suspended for a denaturing treatment, the components may be stirred at a comparatively low temperature of around room temperature. When a reaction product is to be obtained by reacting the components after the contact, the mixture is preferably stirred in the temperature range of 40–130° C. The reaction does not sufficiently proceed at a reaction temperature below 40° C., resulting in a solid component with inadequate properties. On the other hand, control of the reaction becomes difficult at a temperature above 130° C. due to vaporization of the solvent and the like. The reaction time is one minute or more, preferably ten minutes or more, and still more preferably 30 minutes or more.

The following examples are given as the order of contacting the components one another in preparing the solid catalyst component (A1) of the present invention.

(1) (a1)→(d)→(b)→(c)→<<intermediate washing→(d)→(b)>>→final washing→solid catalyst component (A1)

(2) (a1)→(d)→(c)→(b)→<<intermediate washing→(d)→(b)>>→final washing→solid catalyst component (A1)

(3) (a1)→(d)→(b)→(c)→<<intermediate washing→(d)→(b)→(c)>>→final washing→solid catalyst component (A1)

(4) (a1)→(d)→(b)→(c)→<<intermediate washing→(d)→(c)→(b)>>→final washing→solid catalyst component (A1)

(5) (a1)→(d)→(c)→(b)→<<intermediate washing→(d)→(b)→(c)>>→final washing→solid catalyst component (A1)

(6) (a1)→(d)→(c)→(b)→<<intermediate washing→(d)→(c)→(b)>>→final washing→solid catalyst component (A1)

The following examples are given as the order of contacting the components one another in preparing the solid catalyst component (A2) of the present invention.

(7) (a2)→(d)→(b)→(c)+(e)→<<intermediate washing→(d)→(b)>>→final washing→solid catalyst component (A2)

(8) (a2)→(d)→(c)+(e)→(b)→<<intermediate washing→(d)→(b)>>→final washing→solid catalyst component (A2)

(9) (a2)→(d)→(b)→(c)+(e)→<<intermediate washing→(d)→(b)→(c)+(e)>>→final washing→solid catalyst component (A2)

(10) (a2)→(d)→(b)→(c)+(e)<<→intermediate washing→(d)→(c)→(e)→(b)>>→final washing→solid catalyst component (A2)

(11) (a2)→(d)→(c)+(e)→(b)→<<intermediate washing→(d)→(b)→(c)+(e)>>→final washing→solid catalyst component (A2)

(12) (a2)→(d)→(c)+(e)→(b)→<<intermediate washing→(d)→(c)+(e)→(b)>>→final washing→solid catalyst component (A2)

(13) (a2)→(d)→(e)→(b)→(c)→<<intermediate washing→(d)→(b)>>→final washing→solid catalyst component (A2)

(14) (a2)→(d)→(e)→(b)→(c)→<<intermediate washing→(d)→(b)+(c)>>→final washing→solid catalyst component (A2)

(15) (a2)→(d)→(e)→(b)→(c)→<<intermediate washing→(d)→(b)+(e)>>→final washing→solid catalyst component (A2)

(16) (a2)→(d)→(e)→(b)→(c)→<<intermediate washing→(d)→(b)+(c)+(e)>>→final washing→solid catalyst component (A2)

The following examples are given more specifically as the preferable order of contacting the components one another for preparing the solid catalyst component (A3) of the present invention.

(17) (a2)→(d)→(b)→(c)+(f)→<<intermediate washing→(d)→(b)>>→final washing→solid catalyst component (A3)

(18) (a2)→(d)→(c)+(f)→(b)→<<intermediate washing→(d)→(b)>>→final washing→solid catalyst component (A3)

(19) (a2)→(d)→(b)→(c)→(f)→<<intermediate washing→(d)→(b)→(c)→(f)>>→final washing→solid catalyst component (A3)

(20) (a2)→(d)→(b)→(c)+(f)→<<intermediate washing→(d)→(c)+(f)→(b)>>→final washing→solid catalyst component (A3)

(21) (a2)→(d)→(c)+(f)→(b)→<<intermediate washing→(e)→(b)→(c)+(f)>>→final washing→solid catalyst component (A3)

(22) (a2)→(d)→(c)+(f)→(b)→<<intermediate washing→(d)→(c)+(f)→(b)>>→final washing→solid catalyst component (A3)

(23) (a2)→(d)→(f)→(b)→(c)<<→intermediate washing→(d)→(b)>>→final washing→solid catalyst component (A3)

(24) (a2)→(d)→(f)→(b)→(c)→<<intermediate washing→(d)→(b)+(c)>>→final washing→solid catalyst component (A3)

(25) (a2)→(d)→(f)→(b)→(c)→<<intermediate washing→(e)→(b)+(d)>>→final washing→solid catalyst component (A3)

(26) (a2)→(e)→(d)→(b)→(c)→<<intermediate washing→(d)→(b)+(c)+(f)>>→final washing→solid catalyst component (A3)

(27) (a2)→(c)+(f)+(d)→(b)→<<intermediate washing→(b)+(d)>>→final washing→solid catalyst component (A3)
(28) (a2)→(c)+(f)+(d)→(b)→<<intermediate washing→(d)→(b)>>→final washing→solid catalyst component (A3)
(29) (a2)→(c)+(f)+(d)→(b)→<<intermediate washing→(b)+(d)→(c)+(f)>>→final washing→solid catalyst component (A3)
(30) (a2)→(c)+(f)+(d)→(b)→<<intermediate washing→(d)→(b)→(c)+(f)>>→final washing→solid catalyst component (A3)

The following examples are given more specifically as the preferable order of contacting the components one another for preparing the solid catalyst component (A4) of the present invention.
(31) (a2)→(d)→(b)→(c)→(g)→<<intermediate washing→(d)→(b)>>→final washing→solid catalyst component (A4)
(32) (a2)→(d)→(c)→(b)→(g)→<<intermediate washing→(d)→(b)>>→final washing→solid catalyst component (A4)
(33) (a2)→(d)→(b)→(c)→(g)→<<intermediate washing→(d)→(b)→(c)>>→final washing→solid catalyst component (A4)
(34) (a2)→(d)→(b)→(c)→(g)→<<intermediate washing→(d)→(c)→(b)>>→final washing→solid catalyst component (A4)
(35) (a2)→(d)→(c)→(b)→(g)→<<intermediate washing→(d)→(b)→(c)>>→final washing→solid catalyst component (A4)
(36) (a2)→(d)→(c)→(b)→(g)→<<intermediate washing→(d)→(c)→(b)>>→final washing→solid catalyst component (A4)
(37) (a2)→(c)+(d)→(b)→(g)→<<intermediate washing→(d)→(b)>>→final washing→solid catalyst component (A4)
(38) (a2)→(c)+(d)→(b)→(g)→<<intermediate washing→(b)+(d)>>→final washing→solid catalyst component (A4)
(39) (a2)→(c)+(d)→(b)→(g)→<<intermediate washing→(b)+(d)→(c)+(e)>>→final washing→solid catalyst component (A4)
(40) (a2)→(c)+(d)→(b)→(g)→<<intermediate washing→(d)→(b)→(c)+(e)>>→final washing→solid catalyst component (A4)

In the above methods of contacting the components one another for the solid catalyst components (A1) to (A4), catalytic activity can be further improved if the steps in the double parentheses in the above processes of contact are repeated several times, if required. The components (b) and (d) used in the steps in the double parentheses may be either newly added components or residues from the previous steps. In addition to the washing steps indicated in the above processes, the intermediate products in any of the above contact steps may be washed with a hydrocarbon compound which is liquid at normal temperatures.

Based on the above description, a particularly preferable process for preparing the solid catalyst components (A1) to (A4) comprises suspending the dialkoxy magnesium compound (a1) or magnesium compound (a2) in the aromatic hydrocarbon (d) having a boiling point in the range of 50–150° C., causing the tetravalent titanium halide (b) to come into contact with the suspension, and reacting the mixture. In the above process, one or more electron donor compounds (c) and/or an electron donor compound (e), an electron donor compound (f), or a siloxane (g) are caused to come in contact with the suspension at a temperature from −20° C. to 130° C., either before or after the tetravalent titanium halide (b) is caused to contact the suspension, to obtain a solid reaction product (1) In this instance, it is desirable to carry out an aging reaction at a low temperature either before or after the electron donor compounds are caused to contact the suspension. After washing the solid reaction product (1) with a hydrocarbon compound which is liquid at normal temperatures (intermediate washing), the tetravalent titanium halide (b) is again caused to contact the solid reaction product (1) in the presence of an aromatic hydrocarbon compound at a temperature of −20° C. to 100° C., to obtain a solid reaction product (2). As required, the intermediate washing and the reaction may be further repeated several times. Next, the solid reaction product (2) is washed with a hydrocarbon compound which is liquid at normal temperatures (final washing) to obtain the solid catalyst component.

Preferable conditions of the above reactions and washing operations are as follows.

Low temperature aging reaction: −20° C. to 70° C., preferably −10° C. to 60° C., and more preferably 0° C. to 30° C., for 1 minute to 6 hours, preferably 5 minutes to 4 hours, and particularly preferably 10 minutes to 3 hours.

Reaction: 0° C. to 130° C., preferably 40° C. to 120° C., and particularly preferably 50° C. to 115° C., for 0.5 to 6 hours, preferably 0.5 to 5 hours, and particularly preferably 1 to 4 hours.

Washing: at 0° C. to 110° C., preferably 30° C. to 100° C., and particularly preferably 30° C. to 90° C., from 1 to 20 times, preferably 1 to 15 times, and particularly preferably 1 to 10 times. Hydrocarbons used for washing are preferably aromatic hydrocarbons or saturated hydrocarbons which are liquid at normal temperatures. Specific examples include aromatic hydrocarbons such as toluene, xylene, and ethylbenzene, and saturated hydrocarbons such as hexane, heptane, and cyclohexane. The aromatic hydrocarbons are preferably used for the intermediate washing, whereas the saturated hydrocarbons are preferably used for the final washing.

The ratio of the compounds used for preparing the solid catalyst components (A1) to (A4) cannot be generically defined, because such a ratio varies according to the process employed. For example, the tetravalent titanium halide (b) is used in an amount of 0.5 to 100 mols, preferably 0.5 to 50 mols, still more preferably 1 to 10 mols; the electron donor compound (c) is used in an amount of 0.01 to 10 mols, preferably 0.01 to 1 mol, and still more preferably 0.02 to 0.6 mol; the aromatic hydrocarbon (d) are used in an amount of 0.001 to 500 mols, preferably 0.001 to 100 mols, and still more preferably 0.005 to 10 mols; the electron donor compound (e) is used in an amount of 0.01 to 10 mols, preferably 0.01 to 1 mol, and still more preferably 0.02 to 0.6 mol; the electron donor compound (f) is used in an amount of 0.01 to 10 mols, preferably 0.01 to 1 mol, and still more preferably 0.02 to 0.6 mol; the siloxane compound (g) is used in an amount of 0.01 to 100 g, preferably 0.05 to 80 g, and still more preferably 1 to 50 g for one mol of the dialkoxy magnesium (a1) or magnesium compound (a2).

There are no specific limitations to the amount of titanium, magnesium, halogen atoms, and electron donor compounds in the solid catalyst component (A1) of the present invention. The content of titanium is 1.8 to 8.0 wt %, preferably 2.0 to 8.0 wt %, and still more preferably 3.0 to 8.0 wt %; the content of magnesium is 10 to 70 wt %, preferably 10 to 50 wt %, more preferably 15 to 40 wt %, and particularly preferably 15 to 25 wt %; the content of halogen atoms is 20 to 90 wt %, preferably 30 to 85 wt %, more preferably 40 to 80 wt %, and particularly preferably 45 to 75 wt %; and the total amount of the electron donor compounds is 0.5 to 30 wt %, preferably 1 to 25 wt %, and particularly preferably 2 to 20 wt %. To ensure well-balanced comprehensive performance of the solid catalyst component (A1) comprising the electron donor compounds and other components of the present invention, it is preferable that the contents of titanium, magnesium, halogen atoms, and electron donor compounds be respectively 3–8 wt %, 15–25 wt %, 45–75 wt %, and 2–20 wt %.

Compounds represented by the formula $R^{11}_p AlQ_{3-p}$ can be used as the organoaluminum compound (B) for preparing the catalyst for polymerization of olefins of the present invention. In the formula, $R^{11}$ represents a linear or branched alkyl group having 1–4 carbon atoms, Q represents a hydrogen atom or a halogen atom, and p represents a real number satisfying the formula $0<p \leq 3$.

As specific examples of such organoaluminum compounds (B), triethylaluminum, diethylaluminum chloride, triisobutylaluminum, diethylaluminum bromide, and diethylaluminum hydride can be given. These compounds may be used either individually or in combination of two or more. Triethylaluminum and triisobutylaluminum are preferably used.

The same electron donor compounds used for preparing the solid catalyst components can be used as the extend electron donor compound (C) (hereinafter referred to as "component (C)") for preparing the catalyst for polymerizing olefins of the present invention. Particularly preferable compounds for this purpose are ethers such as 9,9-bis (methoxymethyl)fluorine and 2-isopropyl-2-isopentyl-1,3-dimethoxypropane; esters such as methyl benzoate and ethyl benzoate; and organosilicon compounds.

As the organosilicon compounds, compounds of the above formula (5) can be used. As examples of such organosilicon compounds, phenylalkoxysilane, alkylalkoxysilane, phenylalkylalkoxysilane, cycloalkylalkoxysilane, and cycloalkylalkoxysilane can be given.

The following compounds can be given as specific examples of such organosilicon compounds: trimethylmethoxysilane, trimethylethoxysilane, tri-n-propylmethoxysilane, tri-n-propylethoxysilane, tri-n-butylmethoxysilane, triisobutyl methoxysilane, tri-t-butylmethoxysilane, tri-n-butylethoxysilane, tricyclohexylmethoxysilane, tricyclohexylethoxysilane, cyclohexyldimethylmethoxysilane, cyclohexyldiethylmethoxysilane, cyclohexyldiethylethoxysilane, dimethyldimethoxysilane, dimethyldiethoxysilane, di-n-propyldimethoxysilane, diisopropyldimethoxysilane, di-n-propyldiethoxysilane, diisopropyldiethoxysilane, di-n-butyldimethoxysilane, diisobutyldimethoxysilane, di-t-butyldimethoxysilane, di-n-butyldiethoxysilane, n-butylmethyldimethoxysilane, bis(2-ethylhexyl)dimethoxysilane, bis(2-ethylhexyl)diethoxysilane, dicyclopentyldimethoxysilane, dicyclopentyldiethoxysilane, dicyclohexyldimethoxysilane, dicyclohexyldiethoxysilane, bis(3-methylcyclohexyl)dimethoxysilane, bis(4-methylcyclohexyl)dimethoxysilane, bis(3,5-dimethylcyclohexyl)dimethoxysilane, cyclohexylcyclopentyl dimethoxysilane, cyclohexylcyclopentyldiethoxysilane, cyclohexylcyclopentyldipropoxysilane, 3-methylcyclohexylcyclopentyldimethoxysilane, 4-methylcyclohexylcyclopentyldimethoxysilane, 3,5-dimethylcyclohexylcyclopentyldimethoxysilane, 3-methylcyclohexylcyclohexyldimethoxysilane, 4-methylcyclohexylcyclohexyldimethoxysilane, 3,5-dimethylcyclohexylcyclohexyldimethoxysilane, cyclopentylmethyldimethoxysilane, cyclopentylmethyldiethoxysilane, cyclopentylethyldiethoxysilane, cyclopentyl (isopropyl)dimethoxysilane, cyclopentyl(isobutyl) dimethoxysilane, cyclohexylmethyldimethoxysilane, cyclohexylmethyldiethoxysilane, cyclohexylethyldimethoxysilane, cyclohexylethyldiethoxysilane, cyclohexyl(n-propyl)dimethoxysilane, cyclohexyl(iso-propyl)dimethoxysilane, cyclohexyl(n-propyl)diethoxysilane, cyclohexyl (isobutyl)dimethoxysilane, cyclohexyl(n-butyl) diethoxysilane, cyclohexyl(n-pentyl)dimethoxysilane, cyclohexyl(n-pentyl)diethoxysilane, diphenyldimethoxysilane, diphenyldiethoxysilane, phenylmethyldimethoxysilane, phenylmethyldiethoxysilane, phenylethyldimethoxysilane, phenylethyldiethoxysilane, methyltrimethoxysilane, methyltriethoxysilane, ethyltrimethoxysilane, ethyltriethoxysilane, n-propyltrimethoxysilane, isopropyltrimethoxysilane, n-propyltriethoxysilane, isopropyl triethoxysilane, n-butyltrimethoxysilane, isobutyltrimethoxysilane, t-butyltrimethoxysilane, n-butyltriethoxysilane, 2-ethylhexyltrimethoxysilane, 2-ethylhexyltriethoxysilane, cyclopentyltrimethoxysilane, cyclopentyltriethoxysilane, cyclohexyltrimethoxysilane, cyclohexyltriethoxysilane, vinyltrimethoxysilane, vinyltriethoxysilane, phenyltrimethoxysilane, phenyltriethoxysilane, tetramethoxysilane, tetraethoxysilane, tetrapropoxysilane, and tetrabutoxysilane. In addition to the organosilicon compound represented by the above formula (5), aminosilane compounds such as bis(perhydroquinolino)dimethoxysilane and bis(perhydroisoquinolino)dimethoxysilane can be used. Of these, preferable compounds are di-n-propyl dimethoxysilane, diisopropyldimethoxysilane, di-n-butyl dimethoxysilane, diisobutyldimethoxysilane, di-t-butyldimethoxysilane, di-n-butyldiethoxysilane, t-butyltrimethoxysilane, dicyclohexyldimethoxysilane, dicyclohexyldiethoxysilane, cyclohexylmethyldimethoxysilane, cyclohexylmethyldiethoxysilane, cyclohexylethyldimethoxysilane, cyclohexylethyldiethoxysilane, dicyclopentyldimethoxysilane, dicyclopentyldiethoxysilane, cyclopentylmethyldimethoxysilane, cyclopentylmethyldiethoxysilane, cyclopentylethyldiethoxysilane, cyclohexylcyclopentyldimethoxysilane, cyclohexylcyclopentyldiethoxysilane, 3-methylcyclohexylcyclopentyldimethoxysilane, 4-methylcyclohexylcyclopentyldimethoxysilane, and 3,5-dimethylcyclohexylcyclopentyl dimethoxysilane. Either one type of these organosilicon compounds (C) or a combination of two or more types of these compounds can be used in the present invention.

The olefin polymerization catalyst of the present invention comprises the above-described component (A), component (B), and component (C) for the solid catalyst component for polymerizing olefins. Polymerization or copolymerization of olefins is carried out in the presence of this catalyst. The olefins, such as ethylene, propylene, 1-butene, 1-pentene, 4-methyl-1-pentene, and vinyl cyclohexane can be used either individually or in combination of two or more. Of these, ethylene, propylene, and 1-butene can be suitably used. A particularly preferable olefin is propylene. Propylene may be copolymerized with other olefins. As the olefins to be copolymerized, ethylene, 1-butene, 1-pentene, 4-methyl-1-pentene, vinyl cyclohexane, and the like can be used either individually or in combination of two or more. Of these, ethylene and 1-butene can be suitably used.

The ratio of the components used is not specifically limited inasmuch as such a ratio does not influence the effect of the present invention. Usually, the organoaluminum compound (B) is used in an amount of 1–2,000 mols, and preferably 50–1,000 mols, per mol of titanium atoms in the solid catalyst component (A). The organoaluminum compound (C) is used in an amount of 0.002–10 mols, preferably 0.01–2 mols, and particularly preferably 0.01–0.5 mol per mol of the component (B).

Although the order of contact of these compositions is not limited, it is desirable to first add the organoaluminum compound (B) to the polymerization system, then cause the organosilicon compound (C) to come into contact with the organoaluminum compound (B), and causing the solid catalyst component (A) to come into contact with the resulting mixture.

In the present invention, polymerization can be carried out either in the presence or in the absence of an organic solvent. Olefin monomers such as propylene may be used either in a gaseous state or in a liquid state. The polymerization reaction is preferably carried out at a temperature of 200° C. or less, and preferably at 100° C. or less, under a pressure of 10 MPa or less, and preferably 5 MPa or less. Either a continuous polymerization system or a batch polymerization system may be used for the polymerization reaction. In addition, the polymerization can be completed either in one step or in two or more steps.

In polymerizing olefins using the olefin polymerization catalyst component (A), component (B), and component (C), it is desirable to preliminary polymerize the olefins prior to the main polymerization reaction to improve catalytic activity, stereoregularity, properties of the resulting polymer particles, and the like. In addition to the olefins used in the main polymerization, monomers such as styrene can be used in the preliminary polymerization.

Although the order of contact of the components and monomers in carrying out the preliminary polymerization is not limited, it is desirable to first add the organoaluminum compound (B) to the preliminary polymerization system in an inert gas or olefin gas atmosphere, cause the composition (A) for olefin polymerization to come into contact with the component (B), and then cause one or more olefins such as propylene to come contact with the mixture. When the preliminary polymerization is carried out, it is desirable to first add the component (B) to the preliminary polymerization system in an inert gas or olefin gas atmosphere, cause the olefin polymerization catalyst component (A) for to come into contact with the component (B), and then cause one or more olefins such as propylene to come into contact with the mixture.

Polymerization of olefins in the presence of the olefin polymerization catalyst prepared by the process of the present invention can produce highly stereoregular polymers in a high yield, while exhibiting high activity and excellent catalytic activity to hydrogen as compared with the case of polymerization using a conventional catalyst.

EXAMPLES

The present invention will be described in more detail by way of examples, which are explained in comparison with comparative examples. Examples 1, 4–7 and 11 are comparative examples in addition to the examples that are specifically labeled as "Comparative Examples".

Example 1

Preparation of Solid Catalyst Component (A)

A 500 ml round bottom flask equipped with a stirrer, in which the internal atmosphere had been sufficiently replaced by nitrogen gas, was charged with 10 g of diethoxymagnesium and 80 ml toluene to prepare a suspension. After the addition of 20 ml of titanium tetrachloride, the suspension was heated, and when the temperature increased to as high as 80° C., 3.12 ml of diethyl dibutylmalonate was added and the mixture was heated to 110° C. Then, the mixture was reacted for one hour while stirring at 110° C. After the reaction, the resulting reaction mixture was washed three times with 100 ml of toluene at 90° C. After the addition of 20 ml of titanium tetrachloride and 80 ml of toluene, the reaction mixture was heated to 110° C. and reacted for one hour while stirring. After the reaction, the resulting reaction mixture was washed seven times with 100 ml of n-heptane at 40° C., thereby obtaining a solid catalyst component. The liquid in the solid catalyst component was separated from the solid components. The content of titanium in the solid components was determined to confirm that the content was 4.1 wt %.

(Preparation of Polymerization Catalyst and Polymerization)

A 2.0 l autoclave equipped with a stirrer, in which the internal atmosphere had been entirely replaced by nitrogen gas, was charged with 1.32 mmol of triethylaluminum, 0.13 mmol of cyclohexylmethyldimethoxysilane, and the above solid catalyst component (A) in an amount, in terms of the titanium atoms contained therein, of 0.0026 mmol, thereby forming a polymerization catalyst. Then, with the addition of 2.0 l of hydrogen gas and 1.4 l of liquified propylene, preliminary polymerization was carried out for 5 minutes at 20° C., following which the preliminary polymerization product was heated and main polymerization was carried out for one hour at 70° C. The polymerization activity per gram of the solid catalyst component, the n-heptane insoluble matters (HI) in boiling n-heptane in the produced polymer, and the melt flow rate (MFR) of the produced polymer (a) are shown in Table 1.

The polymerization activity per gram of the solid catalyst component used here was calculated by the following formula:

Polymerization activity=Produced polymer(g)/Solid catalyst component(g)

The proportion of boiling n-heptane insoluble matters (HI) in the produced polymer was determined by extracting the polymer for 6 hours in boiling n-heptane and determining the proportion (wt %) of the boiling n-heptane insoluble matters.

The melt flow rate (MFR) of the produced polymer was determined according to the test method conforming to ASTM D1238 or JIS K7210.

Example 2

A solid catalyst component was prepared in the same manner as in Example 1, except for using 3.07 ml of diethyl diisobutylmalonate instead of 3.12 ml of diethyl dibutylmalonate. A polymerization catalyst was prepared from the solid catalyst component and polymerization was carried out using the catalyst. The content of titanium in the resulting solid catalyst component was 4.1 wt %. The polymerization results are shown in Table 1.

Example 3

A solid catalyst component was prepared in the same manner as in Example 1, except for using 2.78 ml of diethyl isopropylmalonate instead of 3.12 ml of diethyl dibutylmalonate. A polymerization catalyst was prepared from the solid catalyst component and polymerization was carried out using the catalyst. The content of titanium in the resulting solid catalyst component was 3.8 wt %. The polymerization results are shown in Table 1.

Example 4

A solid catalyst component was prepared in the same manner as in Example 1, except for using 3.39 ml of diethyl bis(3-chloro-n-propyl)malonate instead of 3.12 ml of diethyl dibutylmalonate. A polymerization catalyst was prepared from the solid catalyst component and polymerization was carried out using the catalyst. The content of titanium in the resulting solid catalyst component was 3.7 wt %. The polymerization results are shown in Table 1.

Example 5

A solid catalyst component was prepared in the same manner as in Example 1, except for using 4.35 ml of diethyl bis(3-chloro-n-propyl)malonate instead of 3.12 ml of diethyl dibutylmalonate. A polymerization catalyst was prepared from the solid catalyst component and polymerization was carried out using the catalyst. The content of titanium in the resulting solid catalyst component was 3.5 wt %. The polymerization results are shown in Table 1.

Example 6

A solid catalyst component was prepared in the same manner as in Example 1, except for using 2.55 ml of diethyl butylbromomalonate instead of 3.12 ml of diethyl dibutylmalonate. A polymerization catalyst was prepared from the solid catalyst component and polymerization was carried out using the catalyst. The content of titanium in the resulting solid catalyst component was 3.0 wt %. The polymerization results are shown in Table 1.

Example 7

A solid catalyst component was prepared in the same manner as in Example 1, except for using 2.98 ml of diethyl butylbromomalonate instead of 3.12 ml of diethyl dibutylmalonate. A polymerization catalyst was prepared from the solid catalyst component and polymerization was carried out using the catalyst. The content of titanium in the resulting solid catalyst component was 2.9 wt %. The polymerization results are shown in Table 1.

Comparative Example 1

A solid catalyst component was prepared in the same manner as in Example 1, except for using 1.80 ml of diethyl phthalate instead of 3.12 ml of diethyl dibutylmalonate. A polymerization catalyst was prepared from the solid catalyst component and polymerization was carried out using the catalyst. The content of titanium in the resulting solid catalyst component was 3.41 wt %. The polymerization results are shown in Table 1.

Comparative Example 2

Preparation of Solid Catalyst Component (A)

A 500 ml round bottom flask equipped with a stirrer, in which the internal atmosphere had sufficiently been replaced with nitrogen gas, was charged with a mixture of 53 ml of decane and 51 ml of 2-ethylhexyl alcohol. 10 g of anhydrous magnesium chloride (manufactured by Toho Titanium Co., Ltd.) was added and the mixture was heated to 130° C. and kept at this temperature while stirring to dissolve the anhydrous magnesium chloride, thereby obtaining a homogeneous solution. 2.2 g of phthalic anhydride was added to the solution and the mixture was reacted for one hour while stirring at 130° C. Separately, a 500 ml round bottom flask equipped with a stirrer, in which the internal atmosphere had been sufficiently replaced by nitrogen gas, was charged with 85 ml of titanium tetrachloride. After cooling to −20° C., the above homogeneous solution was added dropwise. The mixture was heated to 110° C. and 2.78 ml of diethyl diisobutylmalonate was added. The mixture was heated for 2 hours at 110° C. After removing the supernatant solution, 85 ml of titanium tetrachloride was added and the mixture was reacted at 110° C. for 2 hours while stirring. After the reaction, the resulting reaction mixture was washed seven times with 100 ml of n-heptane at 40° C., thereby obtaining a solid catalyst component. The liquid in the solid catalyst component was separated from the solid components. The content of titanium in the solid components was determined to confirm that the content was 2.5 wt %.

(Preparation of Polymerization Catalyst and Polymerization)

A polymerization catalyst was prepared and a polymer was produced in the same manner as in Example 1. The results are shown in Table 1.

Comparative Example 3

Preparation of Solid Catalyst Component (A)

A 500 ml round bottom flask equipped with a stirrer, in which the internal atmosphere had been sufficiently replaced by nitrogen gas, was charged with 10 g of diethoxymagnesium, 2.78 ml of diethyl diisobutylmalonate, and 50 ml of methylene chloride to prepare a suspension. The mixture was heated and reacted for 1 hour while stirring under reflux. Separately, a 1,000 ml round bottom flask equipped with a stirrer, in which the internal atmosphere had been sufficiently replaced by nitrogen gas, was charged with 400 ml of titanium tetrachloride at room temperature. The above suspension was added dropwise. The mixture was heated to 110° C. and reacted for two hours while stirring. After removing the supernatant solution, the residue was washed three times with 400 ml of decane. 400 ml of titanium tetrachloride was added and the mixture was reacted at 120° C. for 2 hours while stirring. After the reaction, the resulting reaction mixture was washed seven times with 400 ml of n-heptane at 40° C., thereby obtaining a solid catalyst component. The liquid in the solid catalyst composition was separated from the solid components. The content of titanium in the solid components was determined to confirm that the content was 3.3 wt %.

(Preparation of Polymerization Catalyst and Polymerization)

A polymerization catalyst was prepared and a polymer was produced in the same manner as in Example 1. The results are shown in Table 1.

TABLE 1

| | Polymerization activity (g-PP/g-cat.) | HI (wt %) | MFR (g/10 min) |
|---|---|---|---|
| Example 1 | 56,900 | 96.5 | 16 |
| Example 2 | 51,400 | 97.2 | 29 |
| Example 3 | 53,000 | 98.2 | 25 |
| Example 4 | 38,900 | 96.4 | 21 |
| Example 5 | 30,600 | 97.6 | 19 |
| Example 6 | 39,000 | 98.0 | 15 |
| Example 7 | 34,600 | 97.2 | 12 |
| Comparative Example 1 | 39,200 | 98.1 | 6.6 |
| Comparative Example 2 | 27,500 | 97.5 | 8.5 |
| Comparative Example 3 | 29,500 | 97.7 | 7.6 |

As can be seen from the results shown in Table 1, olefin polymers with high stereoregularity can be obtained in a high yield by polymerizing propylene using the solid catalyst component and the catalyst of the present invention exhibiting high catalytic activity to hydrogen and high activity.

Example 8

Preparation of Solid Catalyst Component (A)

A 500 ml round bottom flask equipped with a stirrer, in which the internal atmosphere had been sufficiently replaced by nitrogen gas, was charged with 30 ml of titanium tetrachloride and 80 ml toluene to prepare a solution. Next, a suspension prepared from 10 g of spherical diethoxy magnesium (sphericity, l/w: 1.10), 50 ml of toluene, and 2.0 ml of di-n-butyl phthalate was added to the above solution maintained at 10° C. The mixed solution was heated to 60° C. and 4.0 ml of diethyl diisobutylmalonate was added. The mixture was further heated to 90° C. and reacted for two hours while stirring. After the reaction, the resulting solid product was washed four times with 100 ml of toluene at 90° C. After the addition of 30 ml of titanium tetrachloride and 70 ml of toluene, the reaction mixture was heated to 112° C. and reacted for two hours while stirring. After the reaction, the resulting reaction mixture was washed ten times with 100 ml of n-heptane at 40° C., thereby obtaining a solid catalyst component. The content of titanium in the solid catalyst component was analyzed and found to be 2.65 wt %.

(Preparation of Polymerization Catalyst and Polymerization)

A polymerization catalyst was prepared and a polymer was produced in the same manner as in Example 1. The polymerization activity per gram of the solid catalyst composition, the n-heptane insoluble matters (HI) in boiling n-heptane in the resulting polymer (a), the melt flow rate (MFR) of the polymer, the amount of fine powders (212 μm or less) in the polymer, and particle size distribution [(D90-D10)/D50] of the polymer are shown in Table 2.

Example 9

A solid catalyst component was prepared in the same manner as in Example 8, except for changing the amount of di-n-butyl phthalate from 2.0 ml to 2.4 ml and the amount of diethyl diisobutylmalonate from 4.0 ml to 4.4 ml. A polymerization catalyst was prepared from the solid catalyst component and polymerization was carried out using the catalyst. The content of titanium in the resulting solid catalyst composition was 3.0 wt %. The polymerization results are shown in Table 2.

Comparative Example 4

A solid catalyst component was prepared in the same manner as in Example 8, except that diethyl diisobutylmalonate was not added and di-n-butyl phthalate was added in an amount of 2.4 ml instead of 2.0 ml. A polymerization catalyst was prepared from the solid catalyst component and polymerization was carried out using the catalyst. The content of titanium in the resulting solid catalyst composition was 3.3 wt %. The polymerization results are shown in Table 2.

TABLE 2

| | Example 8 | Example 9 | Comparative Example 4 |
|---|---|---|---|
| Polymerization activity (g-PP/g-cat.) | 50,700 | 49,300 | 58,000 |
| HI (wt %) | 98.6 | 98.8 | 98.4 |
| MFR (g/10 min) | 8.4 | 11 | 4.5 |
| Fine polymer powders (212 μm or less) (wt %) | 0 | 0.4 | 3.4 |
| Particle size distribution of polymer | 0.55 | 0.69 | 0.94 |

As can be seen from the results shown in Table 2, olefin polymers with high stereoregularity can be obtained in a high yield by polymerizing propylene using the solid catalyst component and the catalyst of the present invention exhibiting high catalyst activity to hydrogen. In addition, the polymer produced using the solid catalyst component and the catalyst of the present invention has only a very small content of fine powders and has uniform particle distribution.

Example 10

Preparation of Solid Catalyst Component (A)

A 500 ml round bottom flask equipped with a stirrer, in which the internal atmosphere had been sufficiently replaced by nitrogen gas, was charged with 30 ml of titanium tetrachloride and 20 ml toluene to prepare a solution. Next, a suspension prepared from 10 g of spherical diethoxymagnesium (sphericity, l/w: 1.10), 3.1 ml of diethyl diisobutyl malonate, 0.6 ml of diethyl maleate, and 50 ml of toluene was added to the above solution. The mixture was heated to 90° C. and reacted for two hours while stirring. After the reaction, the resulting solid product was washed four times with 100 ml of toluene at 90° C. After the addition of 30 ml of titanium tetrachloride and 70 ml of toluene, the reaction mixture was heated to 110° C. and reacted for two hours while stirring. After the reaction, the resulting reaction mixture was washed ten times with 100 ml of n-heptane at 40° C., thereby obtaining a solid catalyst component. The content of titanium in the solid catalyst component was analyzed and found to be 3.7 wt %.

(Preparation of Polymerization Catalyst and Polymerization)

A polymerization catalyst was prepared and a polymer was produced in the same manner as in Example 1. The results are shown in Table 3.

Example 11

A solid catalyst component was prepared in the same manner as in Example 10, except that diethyl dibutylmalonate was used instead of diethyl diisobutylmalonate and di-n-butyl maleate was used instead of diethyl maleate. A polymerization catalyst was prepared from the solid catalyst component and polymerization was carried out using the catalyst. The content of titanium in the resulting solid catalyst composition was 3.5 wt %. The polymerization results are shown in Table 3.

Comparative Example 5

A solid catalyst component was prepared in the same manner as in Example 10, except that diethyl diisobutylmalonate was not added and diethyl malonate was added in an amount of 1.5 ml instead of 0.6 ml. A polymerization catalyst was prepared from the solid catalyst component and polymerization was carried out using the catalyst. The content of titanium in the resulting solid catalyst composition was 3.7 wt %. The polymerization results are shown in Table 3.

TABLE 3

| | Polymerization activity (g-PP/g-cat.) | HI (wt %) | MFR (g/10 min) |
|---|---|---|---|
| Example 10 | 57,500 | 98.2 | 27 |
| Example 11 | 56,200 | 98.0 | 25 |
| Comparative Example 5 | 58,000 | 98.0 | 11 |

As can be seen from the results shown in Table 3, polymerization of propylene using the solid catalyst component and the catalyst of the present invention can produce highly stereoregular olefin polymers in a high yield with a higher melt flow rate (specifically at a higher catalyst activity to hydrogen) as compared with conventional catalysts.

Example 12

Preparation of Solid Catalyst Component (A)

A 500 ml round bottom flask equipped with a stirrer, in which the internal atmosphere had been sufficiently replaced by nitrogen gas, was charged with 30 ml of titanium tetrachloride and 80 ml toluene to prepare a solution. Next, a suspension prepared from 10 g of spherical diethoxy magnesium (sphericity, l/w: 1.10), 3.1 ml of diethyl diisobutylmalonate, and 50 ml of toluene was added to the above solution. 4 ml of decamethylcyclopentasiloxane was added at 100° C. The mixture was further heated to 110° C. Then, the mixture was reacted for one hour while stirring at 110° C. After the reaction, the resulting solid product was washed four times with 100 ml of toluene at 90° C. After the addition of 30 ml of titanium tetrachloride and 70 ml of toluene, the reaction mixture was heated to 110° C. and reacted for two hours while stirring. After the reaction, the resulting reaction mixture was washed ten times with 100 ml of n-heptane at 40° C., thereby obtaining a solid catalyst component. The content of titanium in the solid catalyst component was analyzed and found to be 3.0 wt %.

(Preparation of Polymerization Catalyst and Polymerization)

A polymerization catalyst was prepared and a polymer was produced in the same manner as in Example 1. The results are shown in Table 4.

Example 13

Preparation of Solid Catalyst Component (A)

A 500 ml round bottom flask equipped with a stirrer, in which the internal atmosphere had been sufficiently replaced by nitrogen gas, was charged with 10 g of diethoxy magnesium, 2.4 ml of di-n-butyl phthalate, and 50 ml of toluene to prepare a suspension. After the addition of 20 ml of titanium tetrachloride to the suspension, the mixture was heated. 2 ml of decamethylcyclopentasiloxane was added to the mixture at temperatures of 80° C. and 100° C. Then, the mixture was further heated to 110° C. Then, the mixture was reacted for one hour while stirring at 110° C. After the reaction, the resulting reaction mixture was washed three times with 100 ml of toluene at 90° C. After the addition of 20 ml of titanium tetrachloride and 80 ml of toluene, the reaction mixture was heated to 110° C. and reacted for one hour while stirring. After the reaction, the resulting reaction mixture was washed seven times with 100 ml of n-heptane at 40° C., thereby obtaining a solid catalyst component. The liquid in the solid catalyst composition was separated from the solid components. The content of titanium in the solid components was determined to confirm that the content was 2.8 wt %.

(Preparation of Polymerization Catalyst and Polymerization)

Polymerization was carried out in the same manner as in Example 1, except for using the solid catalyst composition prepared above. The results are shown in Table 4.

Example 14

A solid catalyst component was prepared in the same manner as in Example 12, except for using 4 ml of 1,3-dichlorotetramethyldisiloxane instead of 4 ml of decamethylcyclopentasiloxane. A polymerization catalyst was prepared from the solid catalyst component and polymerization was carried out using the catalyst. The content of titanium in the resulting solid catalyst composition was 2.3 wt %. The polymerization results are shown in Table 4.

Comparative Example 6

A solid catalyst component was prepared in the same manner as in Example 13, except that diethyl isobutyl malonate was not added. A polymerization catalyst was prepared from the solid catalyst component and polymerization was carried out using the catalyst. The content of titanium in the resulting solid catalyst composition was 2.6 wt %. The polymerization results are shown in Table 4.

TABLE 4

| | Polymerization activity (g-PP/g-cat.) | HI (wt %) | MFR (g/10 min) |
|---|---|---|---|
| Example 12 | 55,500 | 98.6 | 13 |
| Example 13 | 59,800 | 98.5 | 8.5 |
| Example 14 | 59,000 | 98.9 | 10 |
| Comparative Example 6 | 59,200 | 98.9 | 3.6 |

As can be seen from the results shown in Table 4, olefin polymers with high stereoregularity can be obtained in a high yield by polymerizing propylene using the solid catalyst component and the catalyst of the present invention exhibiting high catalyst activity to hydrogen.

INDUSTRIAL APPLICABILITY

The catalyst for polymerization of olefins of the present invention exhibits a high catalyst activity to hydrogen and can produce olefin polymers in a high yield while maintaining high stereoregularity of the olefin polymers. The catalyst is therefore expected not only to produce polyolefins for common use at a low cost, but also to be useful in the manufacture of olefin copolymers having high functions.

The invention claimed is:

1. A solid catalyst component (A1) prepared by contacting (a1) a dialkoxy magnesium compound, (b) a tetravalent titanium halide, and (c) an electron donor compound of the following formula (1), $$R^1R^2C(COOR^3)_2 \quad (1)$$

wherein
$R^1$ and $R^2$ individually represent a branched alkyl group having 3–20 carbon atoms including one or more secondary, tertiary, or quaternary carbon atoms, and
$R^3$ individually represents a linear or branched alkyl group having 1–20 carbon atoms, cycloalkyl group, phenyl group, vinyl group, allyl group, or aralkyl group,
by suspending components (a1), (b) and (c) in (d) an aromatic hydrocarbon having a boiling point in the range of 50–150° C.;
wherein said catalyst component (A1) is suitable for polymerization of olefins.

2. The solid catalyst component (A1) according to claim 1, prepared by further
causing (e) an electron donor compound of the following formula (2), $$(R^4)_lC_6H_4(COOR^5)(COOR^6) \quad (2)$$

wherein
$R^4$ is a linear or branched alkyl group having 1–8 carbon atoms or a halogen atom,
$R^5$ and $R^6$ individually represent a linear or branched alkyl group having 1–12 carbon atoms, and l indicates the number of substituent $R^4$ and is 0, 1, or 2, wherein the groups $R^4$ may be either the same or different when l is 2, to come into contact in the aromatic hydrocarbon (d) having a boiling point in the range of 50–150° C.

3. The solid catalyst component (A1) according to claim 1, prepared by further
causing (f) an electron donor compound of the following formula (3), wherein
$R^7$ and $R^8$ individually represent a hydrogen atom, halogen atom, linear or branched alkyl group having 1–8 carbon atoms, or linear or branched alkyl group having 1–10 carbon atoms substituted with one or two halogen atoms, and
$R^9$ and $R^{10}$ individually represent a linear or branched alkyl group having 2–8 carbon atoms,
to come into contact in the aromatic hydrocarbon (d) having a boiling point in the range of 50–150° C.

4. The solid catalyst component (A1) according to claim 1, prepared by further causing (g) a siloxane to come into contact with the aromatic hydrocarbon (d) having a boiling point in the range of 50–150° C.

5. The solid catalyst component (A1) according to claim 1, wherein $R^1$ and/or $R^2$ in the formula (1) is an isobutyl group.

6. The solid catalyst component (A1) according to claim 1, wherein $R^3$ in the formula (1) is an ethyl group.

7. The solid catalyst component (A1) according to claim 1, wherein the electron donor compound (c) is diethyl diisobutylmalonate.

8. The solid catalyst component (A1) according to claim 3, wherein the electron donor compound (f) of the formula (3) is diethyl maleate or di-n-butyl maleate.

9. A solid catalyst component (A2) prepared by
contacting (a2) a magnesium compound, (b) a tetravalent titanium halide, (c) an electron donor compound of the following formula (1), $$R^1R^2C(COOR^3)_2 \quad (1)$$

wherein
$R^1$ and $R^2$ individually represent a branched alkyl group having 3–10 carbon atoms including one or more secondary, tertiary, or quaternary carbon atoms, and
$R^3$ individually represents a linear or branched alkyl group having 1–20 carbon atoms, cycloalkyl group, phenyl group, vinyl group, allyl group, or aralkyl group, and
(e) an electron donor compound of the following formula (2), $$(R^4)_lC_6H_4(COOR^5)(COOR^6) \quad (2)$$

wherein
$R^4$ is a linear or branched alkyl group having 1–8 carbon atoms or a halogen atom,
$R^5$ and $R^6$ individually represent a linear or branched alkyl group having 1–12 carbon atoms, and
l indicates the number of substituent $R^4$ and is 0, 1, or 2,
wherein the groups $R^4$ may be either the same or different when l is 2;
wherein said catalyst component (A2) is suitable for polymerization of olefins.

10. The solid catalyst component (A2) according to claim 9, prepared by further causing (g) a siloxane to come into contact.

11. A solid catalyst component (A3) prepared by
contacting (a2) a magnesium compound, (b) a tetravalent titanium halide, (c) an electron donor compound of the following formula (1), $$R^1R^2C(COOR^3)_2 \quad (1)$$

wherein
$R^1$ and $R^2$ individually represent a branched alkyl group having 3–10 carbon atoms including one or more secondary, tertiary, or quaternary carbon atoms, and R³ individually represents a linear or branched alkyl group having 1–20 carbon atoms, cycloalkyl group, phenyl group, vinyl group, allyl group, or aralkyl group, and (f) an electron donor compound of the following formula (3), (3)

wherein

R⁷ and R⁸ individually represent a hydrogen atom, halogen atom, linear or branched alkyl group having 1–8 carbon atoms, or linear or branched alkyl group having 1–8 carbon atoms substituted with one or two halogen atoms, and R⁹ and R¹⁰ individually represent a linear or branched alkyl group having 2–8 carbon atoms;

wherein said catalyst component (A3) is suitable for polymerization of olefins.

12. A solid catalyst component (A4) prepared by contacting (a2) a magnesium compound, (b) a tetravalent titanium halide, (c) an electron donor compound of the following formula (1),

R¹R²C(COOR³)₂     (1)

wherein

R¹ and R² individually represent a branched alkyl group having 3–10 carbon atoms including one or more secondary, tertiary, or quaternary carbon atoms, and R³ individually represents a linear or branched alkyl group having 1–20 carbon atoms, cycloalkyl group, phenyl group, vinyl group, allyl group, or aralkyl group, and (g) a siloxane;

wherein said catalyst component (A4) is suitable for polymerization of olefins.

13. A catalyst, comprising:

(A) the solid catalyst component according to claim 1, (B) an organoaluminum compound of the following formula (4), (4)

wherein

R¹¹ represents a linear or branched alkyl group having 1–4 carbon atoms,

Q represents a hydrogen atom or a halogen atom, and p represents a real number satisfying the formula 0<p≦3, and (C) an electron donor compound;

wherein said catalyst is suitable for polymerization of olefins.

14. The catalyst according to claim 13, wherein the electron donor compound (C) is an organosilicon compound of the following formula (5), (5)

wherein the group R¹² individually represents a linear or branched alkyl group having 1–12 carbon atoms, a cycloalkyl group, phenyl group, vinyl group, allyl group, or aralkyl group, R¹³ individually represents a linear or branched alkyl group having 1–4 carbon atoms, cycloalkyl group, phenyl group, vinyl group, allyl group, or aralkyl group, and q is an integer satisfying an inequality of 0≦q≦3.

15. A catalyst, comprising:

(A) the solid catalyst component according to claim 2, (B) an organoaluminum compound of the following formula (4), (4)

wherein

R¹¹ represents a linear or branched alkyl group having 1–4 carbon atoms,

Q represents a hydrogen atom or a halogen atom, and p represents a real number satisfying the formula 0<p≦3, and (C) an electron donor compound;

wherein said catalyst is suitable for polymerization of olefins.

16. A catalyst, comprising:

(A) the solid catalyst component according to claim 3, (B) an organoaluminum compound of the following formula (4), (4)

wherein

R¹¹ represents a linear or branched alkyl group having 1–4 carbon atoms,

Q represents a hydrogen atom or a halogen atom, and p represents a real number satisfying the formula 0<p≦3, and (C) an electron donor compound;

wherein said catalyst is suitable for polymerization of olefins.

17. A catalyst, comprising:

(A) the solid catalyst component according to claim 4, (B) an organoaluminum compound of the following formula (4), (4)

wherein

R¹¹ represents a linear or branched alkyl group having 1–4 carbon atoms,

Q represents a hydrogen atom or a halogen atom, and p represents a real number satisfying the formula 0<p≦3, and (C) an electron donor compound;

wherein said catalyst is suitable for polymerization of olefins.

18. A catalyst, comprising:

(A) the solid catalyst component according to claim 5, (B) an organoaluminum compound of the following formula (4), (4)

wherein

R¹¹ represents a linear or branched alkyl group having 1–4 carbon atoms,

Q represents a hydrogen atom or a halogen atom, and p represents a real number satisfying the formula 0<p≦3, and (C) an electron donor compound;

wherein said catalyst is suitable for polymerization of olefins.

19. A catalyst, comprising:

(A) the solid catalyst component according to claim 6, (B) an organoaluminum compound of the following formula (4), $$R^{11}_p AlQ_{3-p} \quad (4)$$

wherein

R$^{11}$ represents a linear or branched alkyl group having 1–4 carbon atoms,

Q represents a hydrogen atom or a halogen atom, and p represents a real number satisfying the formula $0 < p \leq 3$, and (C) an electron donor compound;

wherein said catalyst is suitable for polymerization of olefins.

20. A catalyst, comprising:

(A) the solid catalyst component according to claim 7, (B) an organoaluminum compound of the following formula (4), $$R^{11}_p AlQ_{3-p} \quad (4)$$

wherein

R$^{11}$ represents a linear or branched alkyl group having 1–4 carbon atoms,

Q represents a hydrogen atom or a halogen atom, and p represents a real number satisfying the formula $0 < p \leq 3$, and (C) an electron donor compound;

wherein said catalyst is suitable for polymerization of olefins.

* * * * *